United States Patent
Azmandian et al.

(10) Patent No.: US 11,651,249 B2
(45) Date of Patent: May 16, 2023

(54) DETERMINING SIMILARITY BETWEEN TIME SERIES USING MACHINE LEARNING TECHNIQUES

(71) Applicant: EMC IP Holding Company LLC, Hopkinton, MA (US)

(72) Inventors: Fatemeh Azmandian, Raynham, MA (US); Peter Beale, Acton, MA (US); Bina K. Thakkar, Cary, NC (US); Zachary W. Arnold, Charlottesville, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 703 days.

(21) Appl. No.: 16/659,844

(22) Filed: Oct. 22, 2019

(65) Prior Publication Data
US 2021/0117824 A1 Apr. 22, 2021

(51) Int. Cl.
*G06F 7/00* (2006.01)
*G06N 5/04* (2023.01)
(Continued)

(52) U.S. Cl.
CPC ........... *G06N 5/04* (2013.01); *G06F 16/2474* (2019.01); *G06N 20/00* (2019.01)

(58) Field of Classification Search
CPC ............... G06F 16/2322; G06F 16/489; G06F 16/5866; G06F 16/686; G06F 16/2474; G06N 5/04; G06N 20/00
See application file for complete search history.

(56) References Cited

U.S. PATENT DOCUMENTS 6,298,155 B1 * 10/2001 Mitsunaga .............. G06T 13/80
382/190
7,770,072 B2 8/2010 Handley et al.
(Continued)

OTHER PUBLICATIONS

Mohammed El Harchi; Finding redundant data sources in smart environment; Master Thesis Report; Department of Mathematics and Computer Science; Eindhoven University of Technology; Jan. 26, 2016. (Year: 2016).*

(Continued)

*Primary Examiner* — Mohammed R Uddin
(74) *Attorney, Agent, or Firm* — Ryan, Mason & Lewis, LLP

(57) ABSTRACT

Methods, apparatus, and processor-readable storage media for determining similarity between time series using machine learning techniques are provided herein. An example computer-implemented method includes obtaining a primary time series and a set of multiple candidate time series; calculating, using machine learning techniques, similarity measurements between the primary time series and each of the candidate time series; for each of the similarity measurements, assigning weights to the candidate time series based on similarity to the primary time series relative to the other candidate time series; generating, for each of the candidate time series, a similarity score based on the weights assigned to each of the candidate time series across the similarity measurements; and outputting, based on the similarity scores, identification of at least one candidate time series for use in one or more automated actions relating to at least one system.

20 Claims, 7 Drawing Sheets

(51) Int. Cl.
*G06N 20/00* (2019.01)
*G06F 16/2458* (2019.01)

(56) References Cited

U.S. PATENT DOCUMENTS

| | | | |
|---|---|---|---|
| 7,962,804 B2 | 6/2011 | Handley et al. | |
| 9,575,828 B2 | 2/2017 | Agarwal et al. | |
| 9,703,664 B1* | 7/2017 | Alshawabkeh | G06F 3/067 |
| 9,952,921 B2 | 4/2018 | Kim et al. | |
| 10,270,668 B1 | 4/2019 | Thompson et al. | |
| 10,827,039 B1 | 11/2020 | Dandekar et al. | |
| 11,093,954 B2* | 8/2021 | Ray | G06Q 30/0202 |
| 11,341,148 B2* | 5/2022 | Asukai | G06F 16/436 |
| 11,345,040 B2* | 5/2022 | Oleynik | B25J 9/1669 |
| 2003/0158466 A1* | 8/2003 | Lynn | A61B 5/00 600/300 |
| 2007/0025594 A1* | 2/2007 | Han | G06T 7/33 382/103 |
| 2007/0208244 A1* | 9/2007 | Brauker | A61B 5/6833 600/365 |
| 2007/0208493 A1* | 9/2007 | Downs | G08G 1/0104 701/117 |
| 2007/0230791 A1* | 10/2007 | Chellapilla | G06V 30/36 382/188 |
| 2007/0239753 A1* | 10/2007 | Leonard | G06Q 30/02 |
| 2008/0271038 A1 | 10/2008 | Rolia et al. | |
| 2009/0012927 A1* | 1/2009 | Brooks | G06Q 30/02 706/52 |
| 2011/0035188 A1* | 2/2011 | Martinez-Heras | G05B 23/021 702/189 |
| 2012/0109563 A1* | 5/2012 | Haam | G06V 10/754 702/89 |
| 2014/0214374 A1* | 7/2014 | Haas | G06F 30/20 703/2 |
| 2015/0095089 A1* | 4/2015 | Ginis | G06Q 10/0637 705/7.22 |
| 2015/0146939 A1* | 5/2015 | Datta | G06T 7/20 382/110 |
| 2015/0160098 A1* | 6/2015 | Noda | G05B 23/0281 702/35 |
| 2016/0253800 A1* | 9/2016 | Gurevich | A61B 5/0071 382/128 |
| 2016/0283270 A1 | 9/2016 | Amaral et al. | |
| 2017/0116319 A1* | 4/2017 | Zhou | G06K 9/00536 |
| 2017/0193372 A1 | 7/2017 | Schimert et al. | |
| 2017/0200107 A1* | 7/2017 | Stouse | G06Q 10/06393 |
| 2018/0018533 A1 | 1/2018 | Taranta, II et al. | |
| 2018/0034685 A1* | 2/2018 | Naous | H04L 41/064 |
| 2018/0150609 A1* | 5/2018 | Kim | G06N 3/04 |
| 2018/0189700 A1* | 7/2018 | Fuke | G06N 20/00 |
| 2018/0270132 A1 | 9/2018 | Hashimoto et al. | |
| 2018/0330201 A1* | 11/2018 | Witbrock | G06N 20/00 |
| 2018/0351355 A1* | 12/2018 | Chen | G06Q 50/06 |
| 2019/0097865 A1 | 3/2019 | Xu et al. | |
| 2019/0155672 A1* | 5/2019 | Wang | G06F 11/0709 |
| 2019/0155682 A1 | 5/2019 | Sinha et al. | |
| 2019/0243739 A1 | 8/2019 | Song et al. | |
| 2019/0327124 A1* | 10/2019 | Lai | H04B 1/38 |
| 2020/0057425 A1 | 2/2020 | Seibert et al. | |
| 2020/0073740 A1 | 3/2020 | Ohana et al. | |
| 2020/0097810 A1* | 3/2020 | Hetherington | G06N 3/0454 |
| 2020/0286001 A1* | 9/2020 | Nguyen | G06N 20/20 |
| 2020/0301740 A1 | 9/2020 | Gabrielson et al. | |
| 2020/0341454 A1* | 10/2020 | Mizoguchi | G05B 23/0221 |
| 2020/0364504 A1 | 11/2020 | Xu et al. | |
| 2020/0386605 A1* | 12/2020 | Oren | G01G 3/14 |
| 2021/0350876 A1* | 11/2021 | Gao | G16B 40/10 |
| 2022/0129172 A1* | 4/2022 | Nagarajegowda | G06K 9/6215 |
| 2022/0166682 A1* | 5/2022 | Patrick | H04L 41/16 |

OTHER PUBLICATIONS

U.S. Appl. No. 16/390,534, filed Apr. 22, 2019.

* cited by examiner

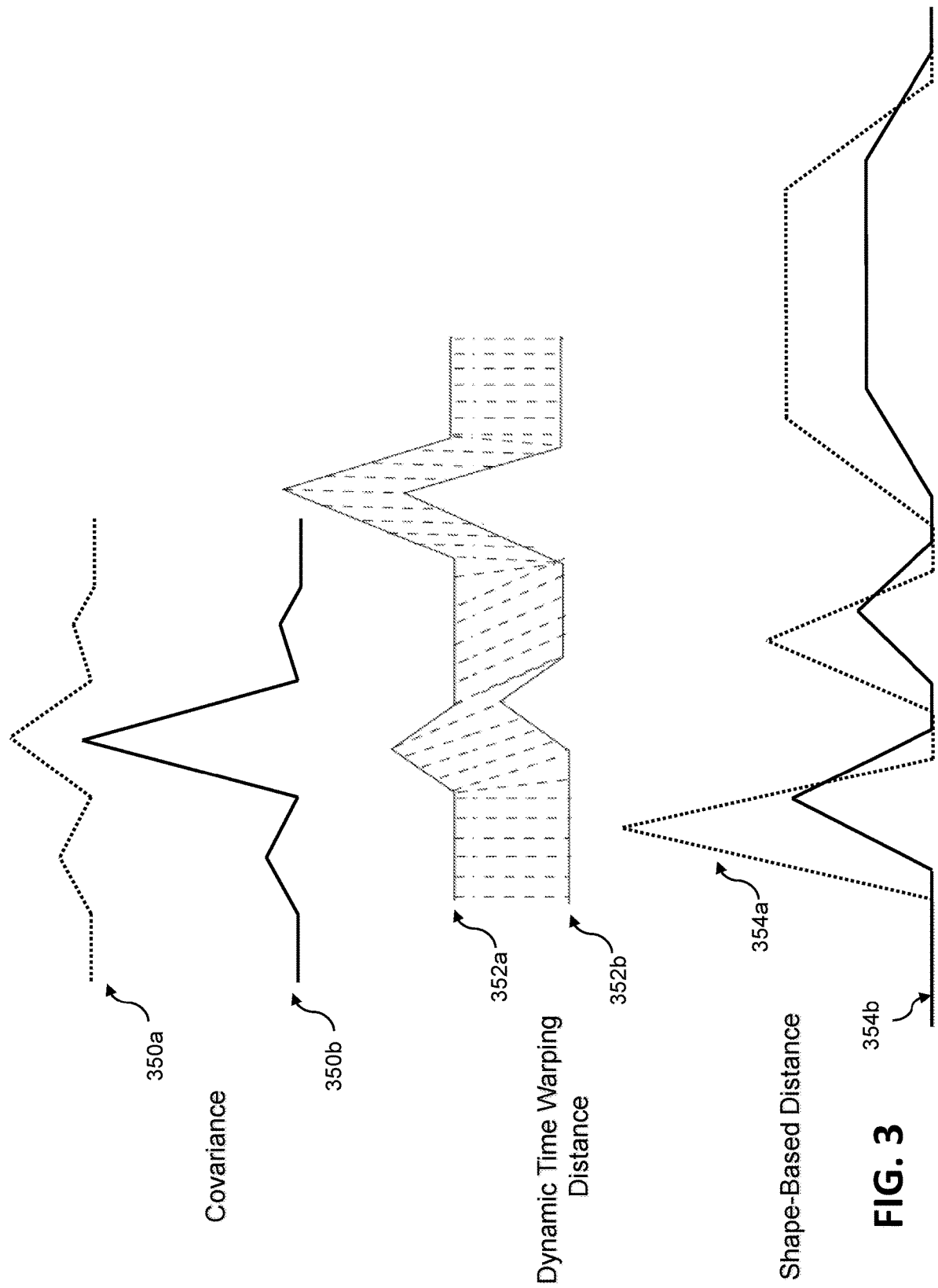

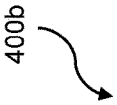

400a

Input: Data for the main time series and a collection of candidate time series
Output: List of most similar time series to the main time series
Method:
*Check if there is enough data*
if main time series is empty or candidate time series is empty or length of time series < 2 time points:
　　insufficient data, unable to find similar matches, return

*Preprocess data*
if there are missing data points:
　　interpolate missing data points if the main time series is constant throughout the time range:
　　unable to find similar matches, return remove candidate time series that are constant throughout the time range if no candidate time series remain:
　　return empty result

*Optional: Filter out stable time series*
if given a percentile threshold (e.g., 25th percentile):
　　calculate the average value of the time series data points, across all candidate time series {dataset_mean} for each candidate time series:
　　　　calculate the difference between its maximum and minimum value {max_min_diff} sort the candidate time series based on its max_min_diff value filter out candidate time series whose max_min_diff is lower than the threshold and whose raw values are always lower than the dataset_mean normalize the data using z-score normalization

*(continued in 400b)*

400b

*(continued from 400a)*

*Score the candidate time series*
for each similarity measure {correlation, dynamic time warping distance, shape-based distance}:
　　calculate the similarity between the main time series and all candidate time series rank the candidate time series based on similarity assign a weight between 0 and 1 to each candidate time series, based on its position in the sorted list for each candidate time series:
　　add up its weights from each similarity measure to produce a final score sort the candidate time series based on their scores return list of top-most similar matches and their scores {output of weighted majority vote}

FIG. 4

DETERMINING SIMILARITY BETWEEN TIME SERIES USING MACHINE LEARNING TECHNIQUES

CROSS-REFERENCE TO RELATED APPLICATIONS

The present application is related to U.S. patent application Ser. No. 16/659,856, entitled "Automatic Identification of Workloads Contributing to System Performance Degradation Using Machine Learning Techniques," U.S. patent application Ser. No. 16/659,862, entitled "Automatic Identification of Resources in Contention in Storage Systems Using Machine Learning Techniques," and U.S. patent application Ser. No. 16/659,872, entitled "Automatic Identification of Workloads Contributing to Behavioral Changes in Storage Systems Using Machine Learning Techniques," each of which is filed concurrently herewith and incorporated by reference herein.

FIELD

The field relates generally to information processing systems, and more particularly to techniques for processing time series data in such systems.

BACKGROUND

With dynamic systems, the behavior of various objects will typically vary over time. Additionally, many such objects are measured on a time-based regularity with respect to one or more variables. A sequence of these measurements results in an object referred to as a time series, and the similarity between two time series within dynamic systems can provide information in terms of the behavior of the measured entities. However, conventional time series analysis approaches face accuracy and scalability challenges.

SUMMARY

Illustrative embodiments of the disclosure provide methods for determining similarity between time series using machine learning techniques. An exemplary computer-implemented method includes obtaining a primary time series and a set of multiple candidate time series, and calculating, using one or more machine learning techniques, multiple similarity measurements between the primary time series and each of the candidate time series. Such a method also includes, for each of the multiple similarity measurements, assigning weights to the candidate time series based at least in part on similarity to the primary time series relative to the other candidate time series. Also, such a method includes generating, for each of the candidate time series, a similarity score based at least in part on the weights assigned to each of the candidate time series across the multiple similarity measurements. Further, such a method additionally includes outputting, based at least in part on the similarity scores, identification of at least one candidate time series for use in one or more automated actions relating to at least one system.

Illustrative embodiments can provide significant advantages relative to conventional time series analysis approaches. For example, challenges associated with accuracy and scalability are overcome in one or more embodiments through implementing a machine learning algorithm or other types of machine learning techniques that incorporate multiple distinct measures of similarity and distance between pairs of time series data points.

These and other illustrative embodiments described herein include, without limitation, methods, apparatus, systems, and computer program products comprising processor-readable storage media.

BRIEF DESCRIPTION OF THE DRAWINGS

FIG. 3 shows visual examples of similarity measures utilized in an illustrative embodiment.

FIG. 4 shows example pseudocode for a time series similarity algorithm in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
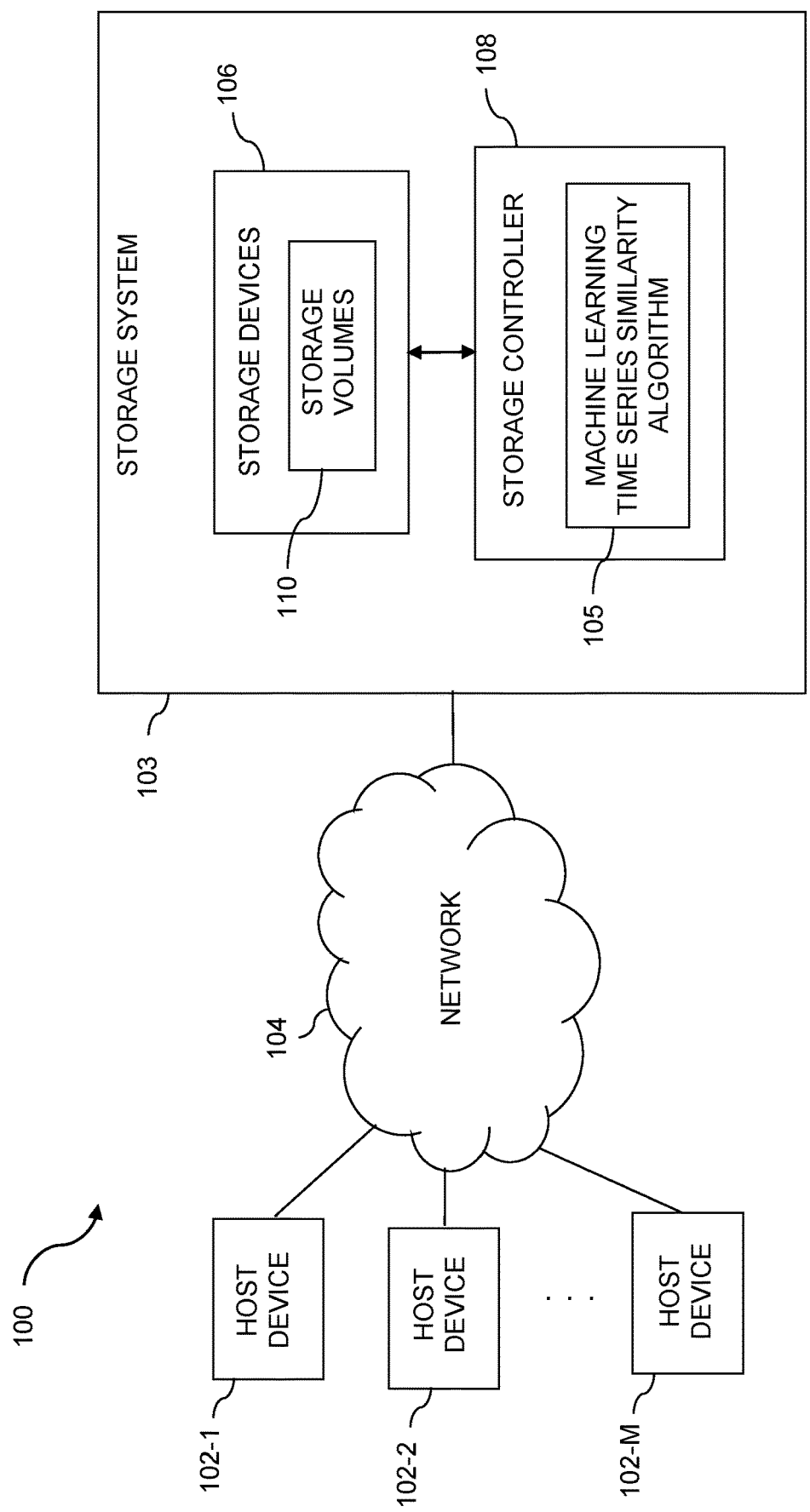
FIG. 1 shows an information processing system configured for determining similarity between time series using machine learning techniques in an illustrative embodiment.

FIG. 1 shows an information processing system 100 configured in accordance with an illustrative embodiment. The information processing system 100 comprises a plurality of host devices 102-1, 102-2, ... 102-M, collectively referred to herein as host devices 102. The host devices 102 are coupled to a network 104. Also coupled to network 104 is storage system 103.

The host devices 102 are configured to communicate with the storage system 103 over network 104.

The host devices 102 illustratively comprise servers or other types of computers of an enterprise computer system, cloud-based computer system or other arrangement of multiple compute nodes associated with respective users. For example, the host devices 102 in some embodiments illustratively provide compute services such as execution of one or more applications on behalf of each of one or more users associated with respective ones of the host devices. In one or more embodiments, the host devices 102 comprises a processor coupled to a memory. The host devices 102 are therefore an example of what is more generally referred to herein as a processing device comprising a processor coupled to a memory. The processor executes application processes of one or more applications on behalf of each of one or more users of the host device 102. Such application process execution results in the generation of write operations and read operations that are directed by the host device 102 to the storage system 103 in the manner disclosed herein.

The storage system 103 illustratively comprises processing devices of one or more processing platforms. For example, the storage system 103 can comprise one or more processing devices each having a processor and a memory, possibly implementing virtual machines and/or containers, although numerous other configurations are possible.

The storage system 103 can additionally or alternatively be part of cloud infrastructure such as an Amazon Web Services (AWS) system. Other examples of cloud-based systems that can be used to provide at least portions of the storage system 103 include Google Cloud Platform (GCP) and Microsoft Azure.

The host devices 102 and the storage system 103 may be implemented on a common processing platform, or on separate processing platforms. The host devices 102 are illustratively configured to write data to and read data from the storage system 103 in accordance with applications executing on those host devices for system users.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 103 comprises a plurality of storage devices 106 and an associated storage controller 108. The storage devices 106 store data of a plurality of storage volumes 110. The storage volumes 110 illustratively comprise respective logical units (LUNs) or other types of logical storage volumes. It should be appreciated, however, that the term "storage volume" as used herein is intended to be broadly construed, and should not be viewed as being limited to any particular format or configuration.

The storage devices 106 of the storage system 103 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in storage system 103 in other embodiments. For example, a given storage system, as the term is broadly used herein, can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 103 illustratively comprises a scale-out all-flash content addressable storage array such as an XtremIO™ storage array from Dell EMC of Hopkinton, Mass. A wide variety of other types of storage arrays can be used in implementing a given one of the storage system 103 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to storage systems based on flash memory or other types of NVM storage devices. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 102 and the storage system 103 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 102 to communicate with the storage system 103 illustratively comprise SCSI or iSCSI commands, other embodiments can implement operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage controller 108 of storage system 103 in the FIG. 1 embodiment includes machine learning time series similarity algorithm 105. The storage controller 108 can also include additional elements, such as replication control logic for controlling replication of one or more of the storage volumes 110 to another storage system not shown in the figure. The storage controller 108 and the storage system 103 may further include one or more additional modules and other components typically found in conventional implementations of storage controllers and storage systems, although such additional modules and other components are omitted from the figure for clarity and simplicity of illustration.

It should be noted that one or more functionalities of storage system 103 (including that provided the machine learning time series similarity algorithm 105) as described herein with reference to host devices 102 can additionally or alternatively be implemented by each of one or more of the additional host devices 102. For example, each of the host devices 102 can be configured to include the machine learning time series similarity algorithm 105 of storage system 103.

The storage system 103 is illustratively implemented as a distributed storage system, also referred to herein as a clustered storage system, in which such a storage system comprises a plurality of storage nodes each comprising a set of processing modules configured to communicate with corresponding sets of processing modules on other ones of the storage nodes. The sets of processing modules of the storage nodes of the storage system 103 collectively comprise at least a portion of the storage controller 108 of the storage system 103. For example, in some embodiments the sets of processing modules of the storage nodes collectively comprise a distributed storage controller of the distributed storage system.

It is to be understood that the particular set of elements shown in FIG. 1 for determining similarity between time series using machine learning techniques involving host devices 102 is presented by way of illustrative example only, and in other embodiments additional or alternative elements may be used. Thus, another embodiment includes additional or alternative systems, devices and other network entities, as well as different arrangements of modules and other components.

An exemplary process utilizing an example machine learning time series similarity algorithm 105 will be described in more detail with reference to the flow diagram of FIG. 5.

Accordingly, at least one embodiment of the invention includes generating and/or implementing a machine learning algorithm for measuring similarity between a baseline/primary time series and a set of other time series to determine a subset of the other time series that most closely resembles the baseline/primary time series of interest. Such similarities can be used to evaluate the relationships between objects in the time series, including causality and common afflictions. As used herein, causality refers to the possibility that the similarity between time series objects and/or data points indicates that one or more of the highlighted objects has caused behavior in the subset that has been evidenced in the baseline time series. Additionally, as used herein, common afflictions refer to the possibility that the objects represented by the time series data points in the baseline/primary time series as well as the candidate time series are exhibiting similar behavior caused by the same entity or entities.

As further detailed herein, one or more embodiments include implementing a machine learning algorithm that incorporates multiple measures of similarity and/or distance between pairs of time series data points. Such measures include, for example, covariance between time series data points, dynamic time warping (DTW) distance between time series data points, and shape-based distance (SBD) of time series data points. Covariance between time series data points represents an indicator of similar patterns of rises and falls (in the time series waveforms), incorporating an assumption that the compared time series (waveforms) are aligned. Also, dynamic time warping distance measurements allow for shifts between the time series as determined by a window size input parameter. Additionally, shape-based distance measurements use a normalized version of a cross-correlation measurement, thereby taking into consideration the shapes of the time series while comparing them. In connection with at least one embodiment, by combining the output of covariance, DTW, and SBD measurements, such an embodiment includes determining and/or identifying a set of similar time series that may benefit from one or more features of each of the individual similarity measures.

Because an input time series dataset may include objects represented on different scales, at least one embodiment includes normalizing the dataset. Such an embodiment includes applying z-score normalization to affect a more comparable evaluation of the time series, as the time series are transformed onto a feature space which allows consistent comparisons.

Once the most similar time series are determined from each of the multiple similarity measures, one or more embodiments include aggregating the results using an ensemble weighting majority voting technique, based on time series profiles across all objects, to select those time series whose behavior most closely follows the spikes and dips in the profile of the primary/baseline time series. Using this information, one or more embodiments additionally include identifying cases of causality and/or common afflictions, as well as remediating such situations and/or issues.

Figure 2:
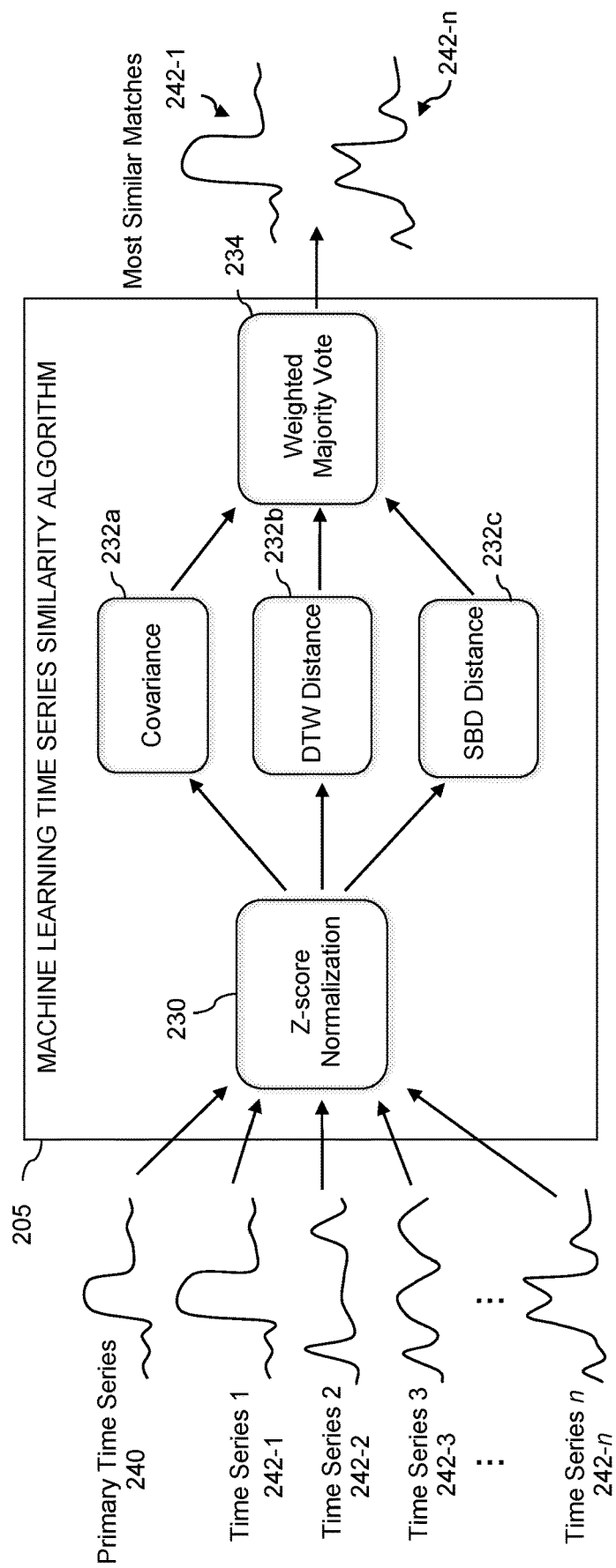
FIG. 2 shows a workflow for determining similarity between time series using machine learning techniques in an illustrative embodiment.

FIG. 2 shows a workflow for determining similarity between time series using machine learning techniques in an illustrative embodiment. By way of illustration, FIG. 2 depicts machine learning time series similarity algorithm 205 processing inputs that include primary time series 240, as well as candidate time series 242-1, 242-2, 242-3, . . . 242-$n$ (hereinafter collectively referred to as candidate time series 242). These inputs are preprocessed by the machine learning time series similarity algorithm 205 via z-score normalization component 230. Subsequently, the preprocessed time series are analyzed via components 232a, 232b, and 232c, to determine (for each candidate time series 242 relative to the primary time series 240) covariance scores, DTW distance scores, and SBD distance scores, respectively.

The scores generated by components 232a, 232b, and 232c are provided to component 234, which generates a weighted majority vote, which is then used to identify the most similar matches among the candidate times series 242 to the primary time series 240 (in the FIG. 2 example, candidate time series 242-1 and 242-n are identified as most similar to primary time series 240).

FIG. 3 shows visual examples of similarity measures utilized in an illustrative embodiment. Specifically, FIG. 3 depicts time series 350a and 350b representative of a covariance (also referred to herein as a correlation) measurement example. As noted above (and depicted in FIG. 3), covariance measurements represent indicators of similar patterns of rises and falls in time series waveforms, incorporating an assumption that the compared time series waveforms (e.g., time series 350a and time series 350b in FIG. 3) are aligned. Also, covariance measurements of normalized data are insensitive to scale differences between time series. Accordingly, in at least one embodiment, high covariance scores represent similar patterns of rises and falls across compared time series.

Additionally, FIG. 3 depicts time series 352a and 352b representative of a dynamic time warping distance measurement example. As noted above (and depicted in FIG. 3), dynamic time warping distance measurements allow for shifts in time series data under comparison (e.g., time series 352a and time series 352b in FIG. 3) as determined by a window size input parameter. Further, FIG. 3 depicts an illustration representative of a shape-based distance measurement example. As noted above (and depicted in FIG. 3), shape-based distance measurements use a normalized version of a cross-correlation measurement, thereby taking into consideration the shapes of the time series being compared (e.g., time series 354a and time series 354b in FIG. 3). Also, shape-based distance measurements are invariant to differences in amplitude and phase.

Referring now to FIG. 4, another illustrative embodiment is shown. In this embodiment, pseudocode 400a-400b (hereinafter collectively referred to as pseudocode 400) is executed by or under the control of a computing device and/or processing platform, such as machine learning time series similarity algorithm 105. For example, pseudocode 400 may be viewed as comprising a portion of a software implementation of at least part of machine learning time series similarity algorithm 105 of the FIG. 1 embodiment.

The pseudocode 400 illustrates an example time series similarity algorithm implemented in one or more embodiments. It is to be appreciated that this particular pseudocode shows just one example implementation of a process for service and workflow definition, and alternative implementations of the process can be used in other embodiments.

Specifically, pseudocode 400 illustrates an example time series similarity algorithm that uses, as input, data pertaining to a primary time series and a collection of candidate time series, and generates, as output, a list of the most similar time series (from the collection of candidates) to the primary time series. As depicted via pseudocode 400, the example time series similarity algorithm includes initially determining if the inputs contain sufficient data. In conjunction with this determination, the example time series similarity algorithm includes preprocessing the input data. For example, if there are missing data points in the input data, the algorithm includes interpolating one or more of the missing data points. Additionally, the algorithm can include removing any candidate time series that exhibits constant activity or values throughout the given time range. Further, the algorithm can optionally include filtering stable time series from the candidate set. It should be appreciated that although the filtering step is noted as optional, the other steps detailed in pseudocode 400 are not necessarily required in all embodiments. In such an embodiment, if given a percentile threshold (e.g., 25th percentile), the algorithm includes calculating the average value of the time series data points across all candidate time series {dataset_mean}. For each candidate time series, the algorithm then includes calculating the difference between its maximum and minimum value {max_min_diff}, and sorting the candidate time series based on the max_min_diff values. The algorithm subsequently includes filtering out any candidate time series whose max_min_diff is lower than the given threshold and whose raw values are always lower than the dataset_mean. Also, the preprocessing performed by the algorithm additionally includes normalizing the data using z-score normalization.

Additionally, pseudocode 400 depicts that the algorithm includes scoring the candidate time series. For each similarity measure (covariance/correlation, dynamic time warping distance, and shape-based distance), the algorithm includes calculating the similarity between the primary time series and all (preprocessed) candidate time series, and ranking the candidate time series based on similarity. The algorithm additionally includes assigning a weight between 0 and 1 to each candidate time series, based on its position in the sorted list. Further, for each candidate time series, the algorithm includes summing its weights from each similarity measure to produce a final score, sorting the candidate time series based on their final scores, and returning a list of the most similar (candidate time series) matches and their scores (that is, an output of weighted majority vote).

As further detailed below, the machine learning algorithm(s) described in connection with one or more embodiments can be implemented in multiple applications and/or use cases, such as, for example, a noisy neighbors determination for storage objects, a determination of system resources in contention, and a determination of contributing entities to specific system behavior.

More specifically, with respect to a noisy neighbors determination for storage objects, many workloads may execute simultaneously on a storage system, each competing for resources. At times, divergently behaving (or misbehaving) workloads may take more than the expected and/or allotted share of resources, resulting in the performance degradation of one or more other workloads. Such degradation can manifest, for example, in the form of a spike in the latency (response time) of a particular workload of interest. When this occurs, at least one embodiment includes identifying these workloads herein referred to as "noisy neighbors," that contributed to the performance degradation. Such an embodiment includes comparing the latency time series of the workload of interest to the input/output operations per second (IOPS) time series of one or more other (e.g., all other) workloads. In an example embodiment, those workloads whose spike in IOPS most closely resembles the spike in latency of the workload in interest can be identified as the noisy neighbors.

With respect to implementing the time series similarity algorithm detailed herein in connection with a noisy neighbors determination, given the latency time series of a primary workload and the IOPS time series of a set of (candidate) workloads, at least one embodiment includes applying the time series similarity algorithm to produce an ordered list of most similar-behaving workloads, ranked by their similarity score. Such an embodiment can include filtering out (candidate) workloads whose correlation to the primary time series is less than a given threshold (i.e., a correlation threshold), calculating the average TOPS of the remaining similar workloads, adding the logarithm of the average IOPS to each workload's score, and ranking the workloads based on their final score.

Additionally, with respect to a determination of system resources in contention, when different workloads running on a storage system utilize the system's resources in a significant manner, the resources can begin to experience contention. The contention can manifest, for example, in the form of a spike in the resources' utilization, which can lead to the performance degradation of workloads which seek to use the over-utilized resources. As in the case of noisy neighbors described above, when a workload exhibits a performance degradation, one or more embodiments can include identifying the resources (e.g., port bandwidth, storage processor utilization, disk IOPS, etc.) that are in contention and/or are unable to satisfy the resource requirements of a workload of interest. Such an embodiment includes comparing the latency time series of the workload of interest to the utilization time series of the storage system's resources. In an example embodiment, those resources whose spike in utilization most closely resembles the spike in latency of the workload in interest can be identified as the resources in contention.

With respect to implementing the time series similarity algorithm detailed herein in connection with a resources in contention determination, given the latency time series of a primary workload and the utilization time series of a set of (candidate) resources, at least one embodiment includes applying the time series similarity algorithm to produce an ordered list of most similar-behaving resources, ranked by their similarity score. Such an embodiment can include filtering out (candidate) resources whose correlation to the primary time series is less than a given threshold (i.e., a correlation threshold), and calculating the average utilization of the remaining similar (candidate) resources. Further, such an embodiment includes filtering out resources whose average utilization is less than a given threshold (that is, a utilization threshold), adding the average utilization value, weighted by a factor (e.g., 6), to each resource's score, and ranking the resources based on their final score.

Further, with respect to a determination of contributing entities to specific system behavior, multiple key performance indicators (KPIs) are commonly collected at the storage system level, and those KPIs are typically aggregated from the corresponding metrics at the workload level. For example, a storage system may exhibit a spike in its TOPS profile, which can be contributed to the spike in TOPS for a set of workloads. Accordingly, one or more embodiments include identifying the relevant workloads contributing to the behavioral change in question (e.g., the behavioral change that caused a spike at the storage system level). Such an embodiment includes comparing the TOPS time series of the storage system to the TOPS time series of one or more other (e.g., all other) workloads. In an example embodiment, those workloads whose behavior is most similar to the behavior at the storage system level can be identified as the contributing workloads.

With respect to implementing the time series similarity algorithm detailed herein in connection with a determination of contributing entities to specific system behavior, given the time series for a performance metric of a primary workload and the time series for the same performance metric of a set of (candidate) workloads, at least one embodiment includes applying the time series similarity algorithm to produce an ordered list of most similar-behaving workloads, ranked by their similarity score. Such an embodiment can include filtering out (candidate) workloads whose correlation to the primary time series is less than a given threshold (i.e., a correlation threshold), and calculating the average value of the performance metric for the remaining similar workloads. Further, such an embodiment includes adding the logarithm of the average value of the performance metric to each workload's score, and ranking the workloads based on their final score.

Additionally, with respect to one or more embodiments, the aspect(s) of machine learning incorporated in connection with the time series similarity algorithm(s) includes learning the best value for one or more model parameters (such as, as noted above, the correlation threshold, and the utilization threshold), as well as for any parameters for the similarity measures (such as, for example, the window parameter for the DTW distance). Such an embodiment includes learning appropriate values to use by evaluating the performance of the algorithm on a set of labeled data, wherein, for example, a domain expert can specify which time series should be included in the final output. Examples of machine learning techniques that can be utilized in one or more embodiments include time series clustering and k-means clustering. Such embodiments include utilizing such machine learning techniques to determine similar objects (in particular, time series) as well as distance calculations between pairs of objects.

Figure 5:
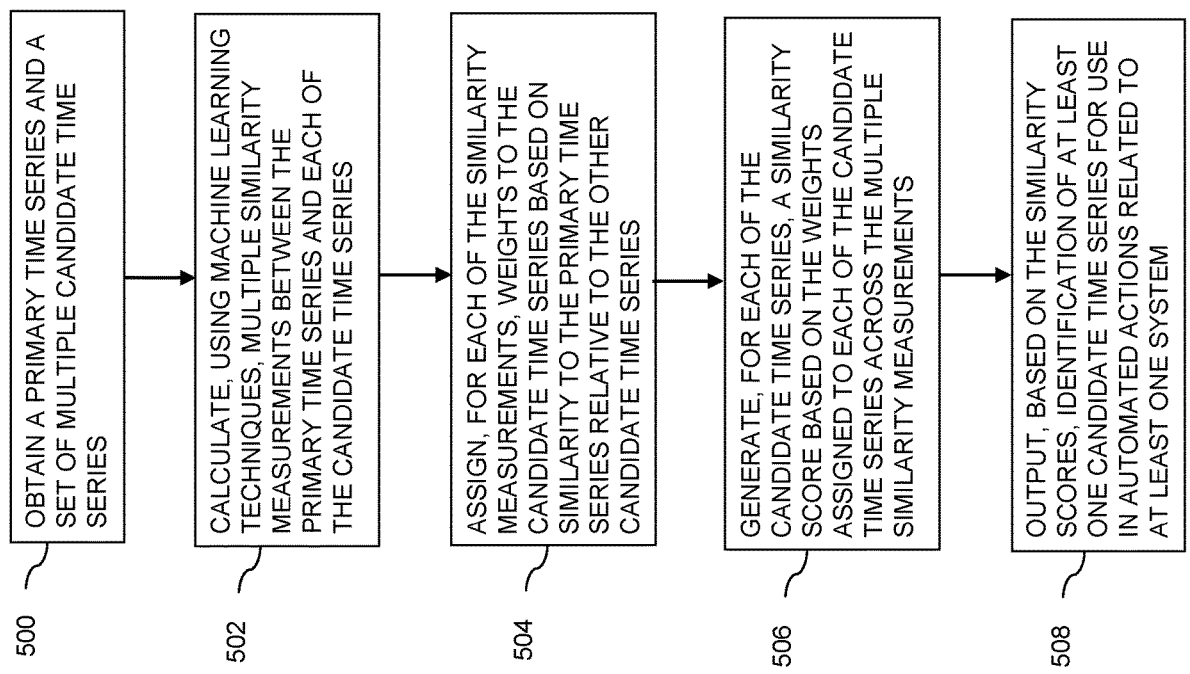
FIG. 5 is a flow diagram of a process for determining similarity between time series using machine learning techniques in an illustrative embodiment.

FIG. 5 is a flow diagram of a process for determining similarity between time series using machine learning techniques in an illustrative embodiment. It is to be understood that this particular process is only an example, and additional or alternative processes can be carried out in other embodiments.

In this embodiment, the process includes steps 500 through 508. These steps are assumed to be performed by the machine learning time series similarity algorithm 105 utilizing its modules 130, 132, 134 and 136.

Step 500 includes obtaining a primary time series and a set of multiple candidate time series. At least one embodiment also includes normalizing the primary time series and the multiple candidate time series. Normalizing can include applying at least one z-score normalization technique to the primary time series and the multiple candidate time series and/or applying one or more interpolation techniques to the primary time series and the multiple candidate time series. Also, at least one embodiment includes filtering, from the set of multiple candidate time series, each of the candidate time series having a difference between a maximum value and a minimum value that is below a predetermined threshold.

Step 502 includes calculating, using one or more machine learning techniques, multiple similarity measurements between the primary time series and each of the candidate time series. The multiple similarity measurements can include a covariance measurement representing an indicator of one or more similar patterns among time series waveforms. Also, the multiple similarity measurements can include a dynamic time warping distance measurement, wherein the dynamic time warping distance measurement incorporates one or more shifts between time series as determined by a window size input parameter. Additionally, the multiple similarity measurements can include a shape-based distance measurement, wherein the shape-based distance measurement incorporates a normalized version of a cross-correlation measurement. Further, in at least one embodiment, calculating the multiple similarity measurements includes calculating the multiple similarity measurements with respect to behavior of at least one time series object of interest over a given period of time.

Step 504 includes, for each of the multiple similarity measurements, assigning weights to the candidate time series based at least in part on similarity to the primary time series relative to the other candidate time series.

Step 506 includes generating, for each of the candidate time series, a similarity score based at least in part on the weights assigned to each of the candidate time series across the multiple similarity measurements.

Step 508 includes outputting, based at least in part on the similarity scores, identification of at least one candidate time series for use in one or more automated actions relating to at least one system. In at least one embodiment, outputting includes outputting, based at least in part on the similarity scores, identification of the at least one candidate time series most similar to the primary time series. Also, in one or more embodiments, the one or more automated actions include evaluating one or more relationships between objects in the primary time series and the at least one identified candidate time series, wherein such relationships can include behavior causality attributed to one or more of the objects and/or behavior exhibited by one or more of the objects being caused by one or more common entities.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement a machine learning algorithm that incorporates multiple distinct measures of similarity and distance between pairs of time series data points. These and other embodiments can effectively enhance accuracy and scalability for time series analysis.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
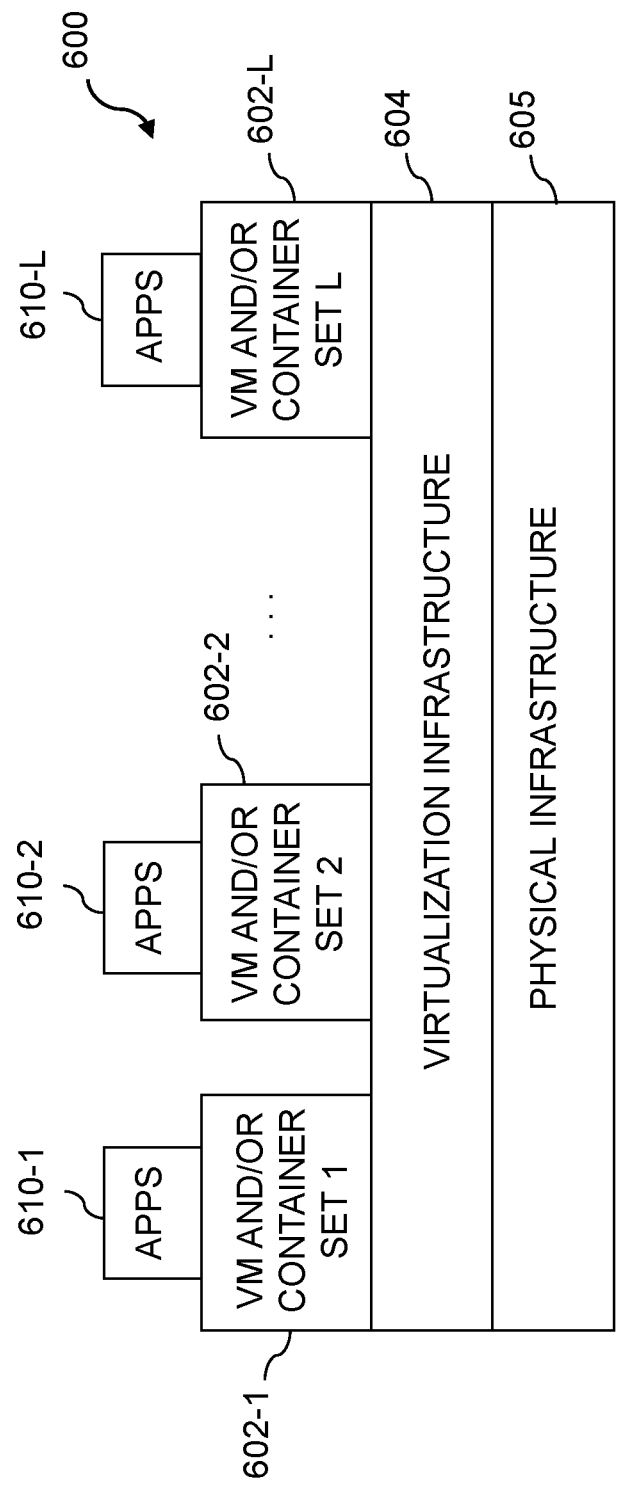
FIGS. 6 and 7 show examples of processing platforms that may be utilized to implement at least a portion of an information processing system in illustrative embodiments.
Figure 7:
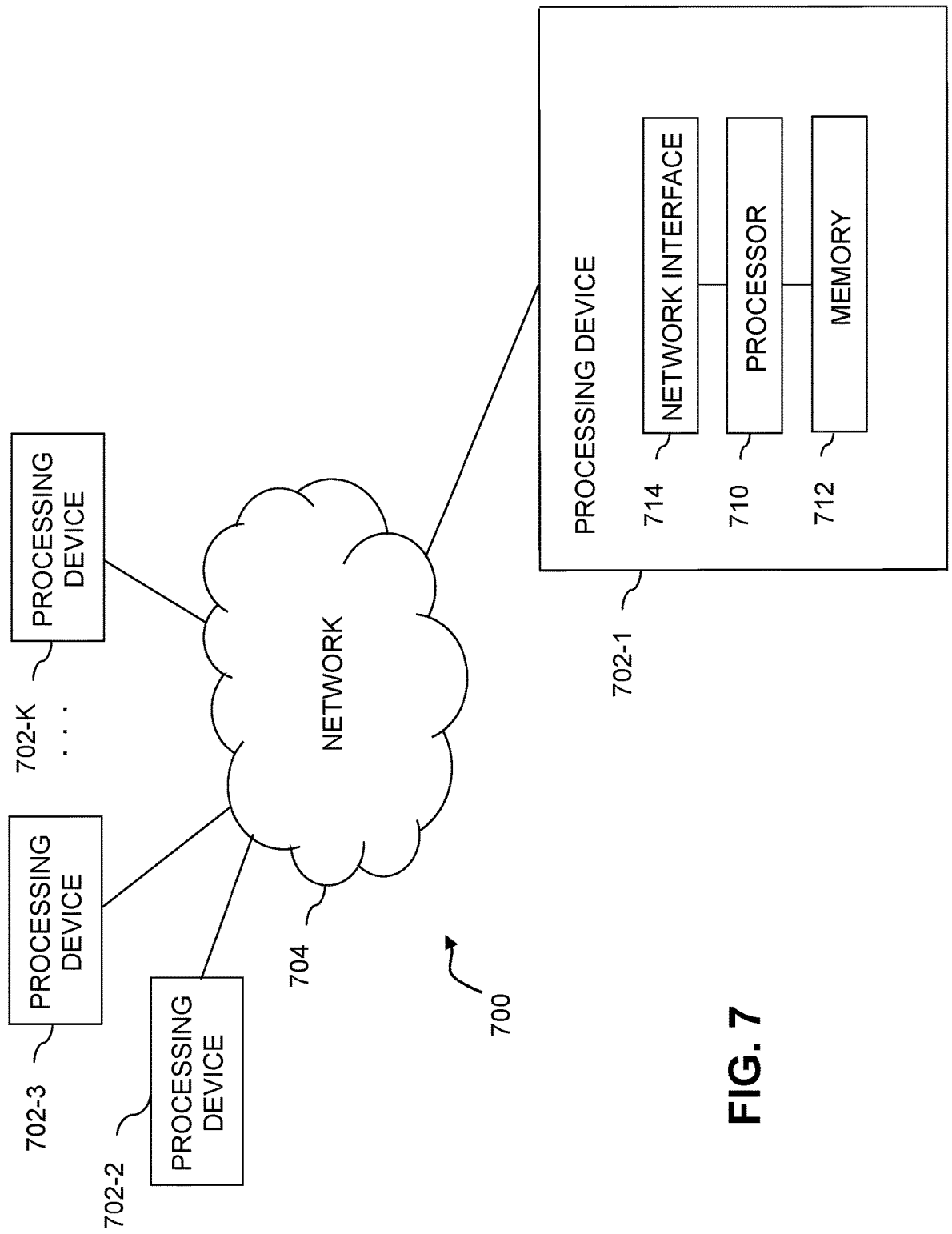

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of information processing systems, host devices and storage systems deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining a primary time series dataset and multiple candidate time series datasets;
filtering out, from the multiple candidate time series datasets, each of the candidate time series datasets having a difference between a maximum data value and a minimum data value that is below a predetermined threshold;

calculating, using one or more machine learning techniques, multiple similarity measurements between the primary time series dataset and each remaining one of the multiple candidate time series datasets;

for each of the multiple similarity measurements, assigning weights to the multiple remaining candidate time series datasets based at least in part on similarity to the primary time series dataset relative to the other remaining candidate time series datasets;

generating, for each of the multiple remaining candidate time series datasets, a similarity score based at least in part on the weights assigned to each of the multiple remaining candidate time series datasets across the multiple similarity measurements; and outputting, based at least in part on the similarity scores, identification of at least one of the remaining candidate time series dataset for use in one or more automated actions relating to at least one system;

wherein the method is performed by at least one processing device comprising a processor coupled to a memory.

2. The computer-implemented method of claim 1, wherein the multiple similarity measurements comprise a covariance measurement representing an indicator of one or more similar patterns among time series waveforms.

3. The computer-implemented method of claim 1, wherein the multiple similarity measurements comprise a dynamic time warping distance measurement, wherein the dynamic time warping distance measurement incorporates one or more shifts between time series as determined by a window size input parameter.

4. The computer-implemented method of claim 1, wherein the multiple similarity measurements comprise a shape-based distance measurement, wherein the shape-based distance measurement incorporates a normalized version of a cross-correlation measurement.

5. The computer-implemented method of claim 1, wherein calculating the multiple similarity measurements comprises calculating the multiple similarity measurements with respect to behavior of at least one time series object of interest over a given period of time.

6. The computer-implemented method of claim 1, further comprising:
normalizing the primary time series dataset and the multiple remaining candidate time series datasets.

7. The computer-implemented method of claim 6, wherein normalizing comprises applying at least one z-score normalization technique to the primary time series dataset and the multiple remaining candidate time series datasets.

8. The computer-implemented method of claim 6, wherein normalizing comprises applying one or more interpolation techniques to the primary time series dataset and the multiple remaining candidate time series datasets.

9. The computer-implemented method of claim 1, wherein the one or more automated actions comprises evaluating one or more relationships between objects in the primary time series dataset and the at least one identified candidate time series dataset.

10. The computer-implemented method of claim 9, wherein the one or more relationships comprise behavior causality attributed to one or more of the objects.

11. The computer-implemented method of claim 9, wherein the one or more relationships comprise behavior exhibited by one or more of the objects being caused by one or more common entities.

12. A non-transitory processor-readable storage medium having stored therein program code of one or more software programs, wherein the program code when executed by at least one processing device causes the at least one processing device:

to obtain a primary time series dataset and multiple candidate time series datasets;

to filter out, from the multiple candidate time series datasets, each of the candidate time series datasets having a difference between a maximum data value and a minimum data value that is below a predetermined threshold;

to calculate, using one or more machine learning techniques, multiple similarity measurements between the primary time series dataset and each remaining one of the multiple candidate time series datasets;

for each of the multiple similarity measurements, to assign weights to the multiple remaining candidate time series datasets based at least in part on similarity to the primary time series dataset relative to the other remaining candidate time series datasets;

to generate, for each of the multiple remaining candidate time series datasets, a similarity score based at least in part on the weights assigned to each of the multiple remaining candidate time series datasets across the multiple similarity measurements; and to output, based at least in part on the similarity scores, identification of at least one of the remaining candidate time series dataset for use in one or more automated actions relating to at least one system.

13. The non-transitory processor-readable storage medium of claim 12, wherein the multiple similarity measurements comprise a covariance measurement representing an indicator of one or more similar patterns among time series waveforms.

14. The non-transitory processor-readable storage medium of claim 12, wherein the multiple similarity measurements comprise a dynamic time warping distance measurement, wherein the dynamic time warping distance measurement incorporates one or more shifts between time series as determined by a window size input parameter.

15. The non-transitory processor-readable storage medium of claim 12, wherein the multiple similarity measurements comprise a shape-based distance measurement, wherein the shape-based distance measurement incorporates a normalized version of a cross-correlation measurement.

16. An apparatus comprising:
at least one processing device comprising a processor coupled to a memory;
the at least one processing device being configured:
to obtain a primary time series dataset and multiple candidate time series datasets;
to filter out, from the multiple candidate time series datasets, each of the candidate time series datasets having a difference between a maximum data value and a minimum data value that is below a predetermined threshold;
to calculate, using one or more machine learning techniques, multiple similarity measurements between the primary time series dataset and each remaining one of the multiple candidate time series datasets;
for each of the multiple similarity measurements, to assign weights to the multiple remaining candidate time series datasets based at least in part on similarity to the primary time series dataset relative to the other remaining candidate time series datasets;
to generate, for each of the multiple remaining candidate time series datasets, a similarity score based at least in part on the weights assigned to each of the multiple remaining candidate time series datasets across the multiple similarity measurements; and to output, based at least in part on the similarity scores, identification of at least one of the remaining candidate time series dataset for use in one or more automated actions relating to at least one system.

17. The apparatus of claim 16, wherein the multiple similarity measurements comprise a covariance measurement representing an indicator of one or more similar patterns among time series waveforms.

18. The apparatus of claim 16, wherein the multiple similarity measurements comprise a dynamic time warping distance measurement, wherein the dynamic time warping distance measurement incorporates one or more shifts between time series as determined by a window size input parameter.

19. The apparatus of claim 16, wherein the multiple similarity measurements comprise a shape-based distance measurement, wherein the shape-based distance measurement incorporates a normalized version of a cross-correlation measurement.

20. The apparatus of claim 16, wherein calculating the multiple similarity measurements comprises calculating the multiple similarity measurements with respect to behavior of at least one time series object of interest over a given period of time.

* * * * *

UNITED STATES PATENT AND TRADEMARK OFFICE
CERTIFICATE OF CORRECTION

PATENT NO. : 11,651,249 B2
APPLICATION NO. : 16/659844
DATED : May 16, 2023
INVENTOR(S) : Fatemeh Azmandian et al.

It is certified that error appears in the above-identified patent and that said Letters Patent is hereby corrected as shown below:

In the Claims

In Claim 1, Column 15, Lines 15-18, replace:
"outputting, based at least in part on the similarity scores, identification of at least one of the remaining candidate time series dataset for use in one or more automated actions relating to at least one system;"
With:
-- outputting, based at least in part on the similarity scores, identification of at least one of the remaining candidate time series datasets for use in one or more automated actions relating to at least one system; --

In Claim 12, Column 16, Lines 25-28, replace:
"to output, based at least in part on the similarity scores, identification of at least one of the remaining candidate time series dataset for use in one or more automated actions relating to at least one system."
With:
-- to output, based at least in part on the similarity scores, identification of at least one of the remaining candidate time series datasets for use in one or more automated actions relating to at least one system. --

In Claim 16, Column 17, Lines 3-6, replace:
"to output, based at least in part on the similarity scores, identification of at least one of the remaining candidate time series dataset for use in one or more automated actions relating to at least one system."
With:
-- to output, based at least in part on the similarity scores, identification of at least one of the remaining candidate time series datasets for use in one or more automated actions relating to at least one system. --

Signed and Sealed this
Thirtieth Day of January, 2024

Katherine Kelly Vidal
*Director of the United States Patent and Trademark Office*